(12) United States Patent  
Trautmann et al.

(10) Patent No.: US 8,816,660 B2
(45) Date of Patent: Aug. 26, 2014

(54) METHOD FOR THE CLOSED-LOOP CONTROL OF A BUCK CONVERTER AND ARRANGEMENT FOR IMPLEMENTING THE METHOD

(75) Inventors: Frank Trautmann, München (DE); Armin Stingl, Wörthsee (DE)

(73) Assignee: Zentrum Mikroelektronik Dresden AG, Dresden (DE)

( * ) Notice: Subject to any disclaimer, the term of this patent is extended or adjusted under 35 U.S.C. 154(b) by 0 days.

(21) Appl. No.: 13/513,620

(22) PCT Filed: Dec. 2, 2010

(86) PCT No.: PCT/DE2010/001401
§ 371 (c)(1),
(2), (4) Date: Sep. 6, 2012

(87) PCT Pub. No.: WO2011/066822
PCT Pub. Date: Jun. 9, 2011

(65) Prior Publication Data
US 2012/0319672 A1    Dec. 20, 2012

(30) Foreign Application Priority Data
Dec. 2, 2009    (EP) ..................................... 09177780

(51) Int. Cl.
*G05F 1/40*    (2006.01)
(52) U.S. Cl.
USPC ........................................................ 323/282
(58) Field of Classification Search
USPC ................. 323/265, 273, 282, 283, 311, 312; 363/62
See application file for complete search history.

(56) References Cited

U.S. PATENT DOCUMENTS

| 6,031,749 A | 2/2000 | Covington et al. |
| 6,504,321 B2 | 1/2003 | Giannopoulos et al. |
| 7,239,257 B1 * | 7/2007 | Alexander et al. ............ 341/138 |

(Continued)

FOREIGN PATENT DOCUMENTS

| TW | 200830676 A | 7/2008 |
| WO | 2005/079227 A2 | 9/2005 |

OTHER PUBLICATIONS

International Search Report for Application PCT/DE2012/001401, dated Mar. 25, 2011.

(Continued)

*Primary Examiner* — Adolf Berhane
(74) *Attorney, Agent, or Firm* — Heslin Rothenberg Farley & Mesiti P.C.

(57) ABSTRACT

A method for regulating a buck converter, in which the amount of the output volume is adjusted via a controlled switching, comprising a pulse sequence having a pulse rate and being pulse width modulated, and an inductor, which is switched serially with a load over which an output voltage drops, and an arrangement with a control input and with a control output, between which an analog-to-digital converter, a non-linear amplifier, an IIR filter, and a pulse width modulation circuit is switched, to allow a quick reaction upon a load transient by which the regulation of the output voltage at a buck converter occurs faster and with less overshooting. This is attained such that the sample rate is adjusted to be greater than the pulse rate and the pulse values of the pulse sequence are controlled during the cycle duration.

9 Claims, 5 Drawing Sheets

(56) References Cited

U.S. PATENT DOCUMENTS

Figure 1:
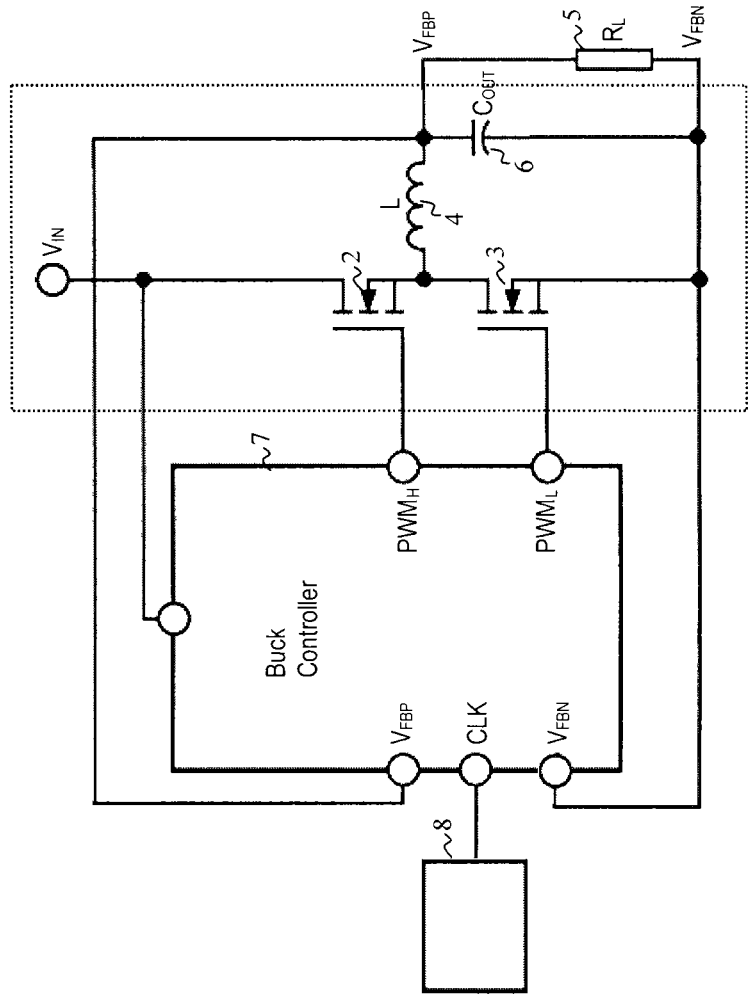

| | | | |
|---|---|---|---|
| 7,652,604 B2* | 1/2010 | Parayandeh et al. | 341/143 |
| 7,902,803 B2* | 3/2011 | Peng et al. | 323/283 |
| 8,319,486 B2* | 11/2012 | Maksimovic et al. | 323/283 |
| 2004/0046456 A1 | 3/2004 | Tracy et al. | |
| 2004/0232898 A1 | 11/2004 | Morris et al. | |
| 2007/0052556 A1 | 3/2007 | Janssen et al. | |
| 2008/0186006 A1 | 8/2008 | Chapuis | |
| 2008/2004290 | 8/2008 | Parayandeh et al. | |

OTHER PUBLICATIONS

Kelly, A, "Current Share in Multiphase DC-DC Converters Using Digital Filtering Techniques", IEEE Transactions on Power Electronics, IEEE Service Center, Piscataway, NJ, US, vol. 24, Issue 1, pp. 212-220, Jan. 1, 2009.

National Examination Report dated Jul. 19, 2013 for corresponding Taiwanese application No. 099142042.

Wenjin Hu et al., "Adaptive control of DC-DC converters based on input equivalent disturbance", Control Conference, 2008, CCC 2008, 27th Chinese (Abstract only).

Elmore M. et al., "Adaptive model following control for switching regulators with unput filters", Industrial Electronics Society, 2003, IECON '03, The 29th Annual Conference of the IEEE (Abstract only.).

National Examination Report dated Oct. 11, 2013 for corresponding Korean application No. 10-2012-7017255.

Corradini et al., "High-Bandwidth Multisampled Digitally Controlled DC-DC Converters Using Ripple Compensation", IEEE Transactions on Industrial Electronics, vol. 55, No. 4, Apr. 2008.

* cited by examiner

METHOD FOR THE CLOSED-LOOP CONTROL OF A BUCK CONVERTER AND ARRANGEMENT FOR IMPLEMENTING THE METHOD

CROSS REFERENCE TO RELATED APPLICATIONS

This application is a 371 filing of international application PCT/DE2010/001401 filed on Dec. 2, 2010 and published in German as WO 2011/066822 A1 on Jun. 9, 2011, and claims priority of European Application No. 09177780.5 filed on Dec. 2, 2009, the entire content of these applications being hereby incorporated by reference herein.

BACKGROUND ART

The invention relates to a method for regulating a buck converter, in which the amount of the output voltage is adjusted at an input voltage via a controlled switching of an inductor, switched serially with a load and over which the output voltage drops, using a pulse sequence showing a pulse rate and pulse width being modulated. Here, the output voltage is scanned with a sample rate, its value is digitized, and thus the pulse width is adjusted.

The invention also relates to an arrangement for regulating a buck converter, comprising a control input for a pulse width modulated pulse sequence with a pulse rate and a voltage output. The arrangement comprises a control input, which can be connected to the voltage output of the buck converter, and is provided with a control output, which can be connected to the control input of the buck converter. A non-linear amplifier, an IIR filter, and a pulse width modulation circuit are switched between the control input and the control output. Furthermore, a pulse rate clock generator is provided, determining the pulse rate.

Using a known buck converter, a controlled output voltage can be generated from an input voltage. Here, the amount of the output voltage is always lower than the amount of the input voltage. The amount of the output voltage is adjusted by a controlled switching on and off using at least one switch.

In an embodiment of prior art, two switching transistors are provided, each respectively switching alternating. Both transistors are connected with their source-drain paths in a current circuit between the input voltage and the ground. An inductor is connected therebetween, which is switched serially with a load resistor, over which the output voltage drops. A capacitor is arranged in parallel to the load resistor.

During the period the first transistor is switched on, namely the one located at the side of the input voltage, a load current flows through the inductor and through the load resistor. The second transistor is blocked. During the period the first transistor is switched off, the second transistor is switched on. Now the energy stored in the inductor is drained. The current flows through the load resistor, however now through the second transistor and out of the capacitor.

By modifying the switch on and switch off periods of the transistors the output voltage can be adjusted and controlled by adjusting these periods using settings in turn influenced by the output voltage itself. Here, the regulation occurs in a known fashion by pulse width modulation (PWM) of the control pulses at the gates of the transistors.

An arrangement for controlling a buck converter is known for example from ADP 1872 of Analog Device Inc.

In a digital solution of such a regulation (Digital Control Loop) the output voltage is subjected to an analog-to-digital conversion. Here, the digital voltage value is scanned with a sample rate and supplied via a non-linear amplification and filtering via an infinite impulse response filter (IIR filter) to a pulse width modulation control in order to adjust the pulse width of the gate pulse at the two transistors. Here, the sample rate of the analog-to-digital conversion, not least due to the common use of the same clock base, is identical to the pulse rate of the gate pulses. In other words, the duty cycle of the series of gate pulses, with their duration being modulated, which represents the pulse width modulation, is equivalent to the sample cycle between two samples of the analog-to-digital converter. This leads to the pulse widths during the duty cycle being adjustable only at its beginning.

In a rapid change of load (load transient), with considerable changes of the output voltage occurring within the duty cycle, the pulse width modulation cannot react to such load transients, namely only via the next sample in the next duty cycle. This leads to a high sluggishness and the control overshooting.

The invention is now based on the objective to provide a method and an arrangement by which rapid reaction can occur for any load transient and this way the control of the output voltage at a buck converter occurs quicker and with less overshooting.

BRIEF SUMMARY OF THE INVENTION

This objective is attained in a method such that the sample rate is adjusted greater than the pulse rate and the pulse width of the pulse sequence is controlled during the duration of the period. With higher sample rates it is possible, in case of large load transients, to determine the hereby triggered rapid change of the output voltage even during the period of the pulse sequence, i.e., between the pulses, and to adjust the pulse width also between the pulses to the actual (in large transients very rapid changes of voltage). This way, the control is switched very quickly and overshooting is reduced or prevented to a large extent.

Preferably the sample rate amounts from 2 to 100 times the pulse rate. It has proven very well functional when the sample rate amounts to 32 times the pulse rate.

Due to the fact that the scanning with a sample rate relatively high in reference to the pulse rate (over-sampling) yields a plurality of values, this leads to inhomogeneous control processes. This way the output voltage "ripples" even in a steady state, due to the constant switching of the transistors. Due to the high scanning rate even such normal voltage changes are registered as deviating from the norm and the control is activated. In order to avoid such erratic control behavior it is beneficially provided that the digital signal generated by the sample rate is subjected to a digital reduction via filtering such that sample values are filtered out which are to be allocated to an integer multiple of the sample frequency according to the sample rate. This beneficially occurs via moving average filters known per se. This comprises several filter maxima at the integer multiples of the sample frequency.

In one embodiment of the method it is provided that a reduction rate is programmed in the moving average filter, by which the digital values are filtered out using the adjusted reduction rate.

This way it is also possible that the reduction with the first reduction rate can be performed during the periods with essentially constant load, i.e., with a first transient, and with a second reduction rate during the periods of load changes, i.e., with a second transient higher in reference to the first transient, with the second reduction rate being smaller than the first reduction rate. In case of rapid changes of the output voltage the many intermediately determined digital values are valuable as the control parameter, because they can be used to determine the very rapidly occurring changes. For this reasons, using this variant of the method the reduction of the values can be reduced so that here a greater number of values is available for the control parameter.

With regard to the arrangement, the objective is attained such that a moving average filter is switched between the analog-to-digital converter and the non-linear amplifier. Furthermore, a sample rate clock generator is provided, which adjusts a sample rate higher in reference to the pulse rate. Using its sample rate, the analog-to-digital converter, the moving average filter, the non-linear amplifier, and the IIR filter are controlled. The pulse rate clock generator is connected to the pulse width modulation circuit and the pulse width modulation circuit is embodied continuously, i.e., it can be controlled with regard to the pulse width even during the pulse duty cycle. The analog-to-digital converter is therefore operated with the higher sample rate (over-sampling) and thus it is capable, even within the duty cycles of periods of the pulse sequence by which the transistors are controlled, to provide values of the deviation from the rule, i.e., the output voltage or the difference of the output voltage from a target value. This way it is possible to adjust the pulse width even during the period to the changes of the output voltage, which particularly in case of high transients leads to a quick adjustment.

In a beneficial embodiment of the arrangement it is provided that the moving average filter comprises two moving average filters or also two filter paths with differently programmable reduction rates. The filter can therefore be switched between two reduction rates, depending on the speed of the change of deviations from the rule. This way it is possible, in case of high transients, to provide a larger number of scanning values for the deviation from the rule.

BRIEF DESCRIPTION OF THE DRAWING FIGURES

Figure 5:
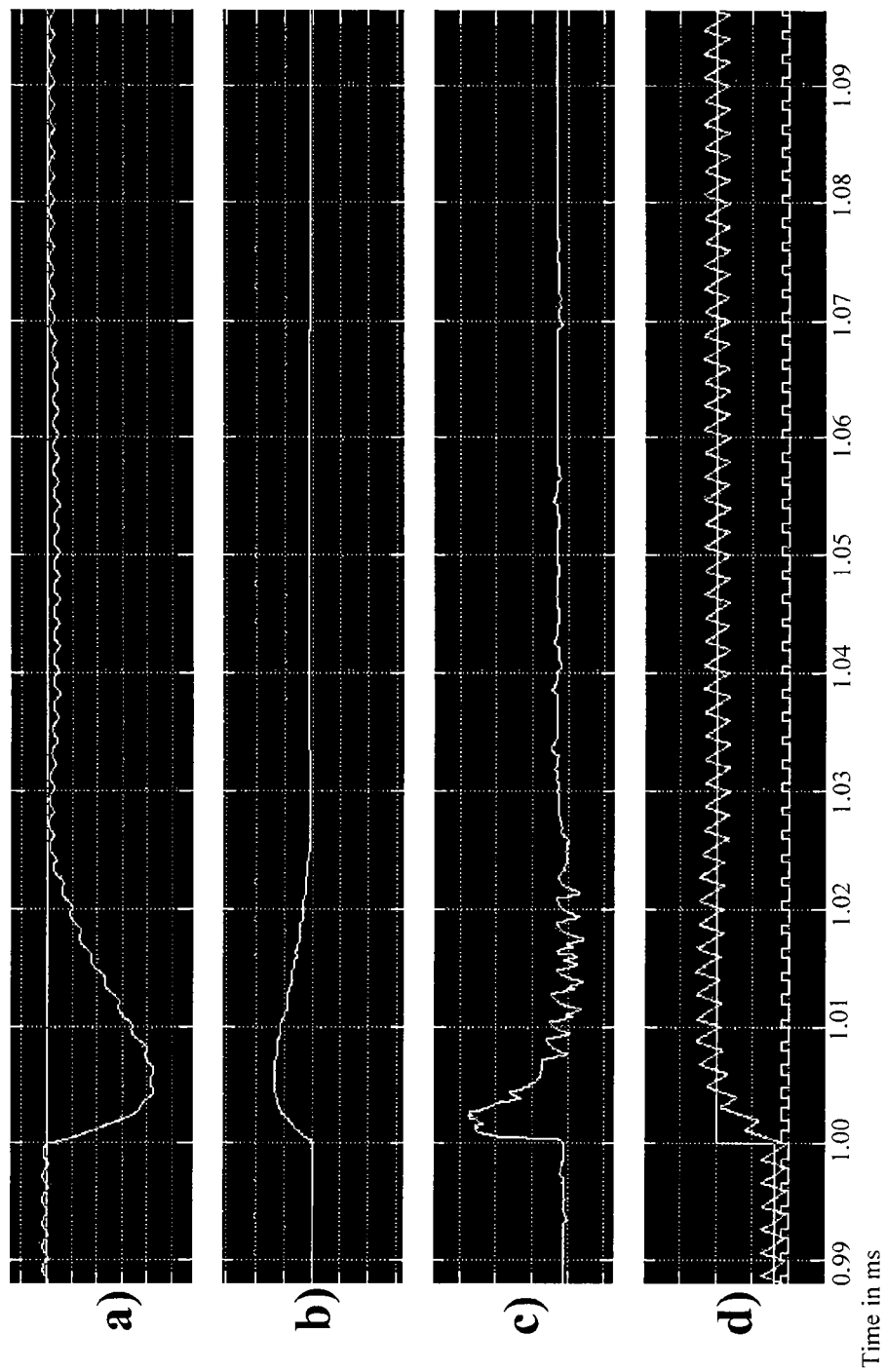
Figure 6:
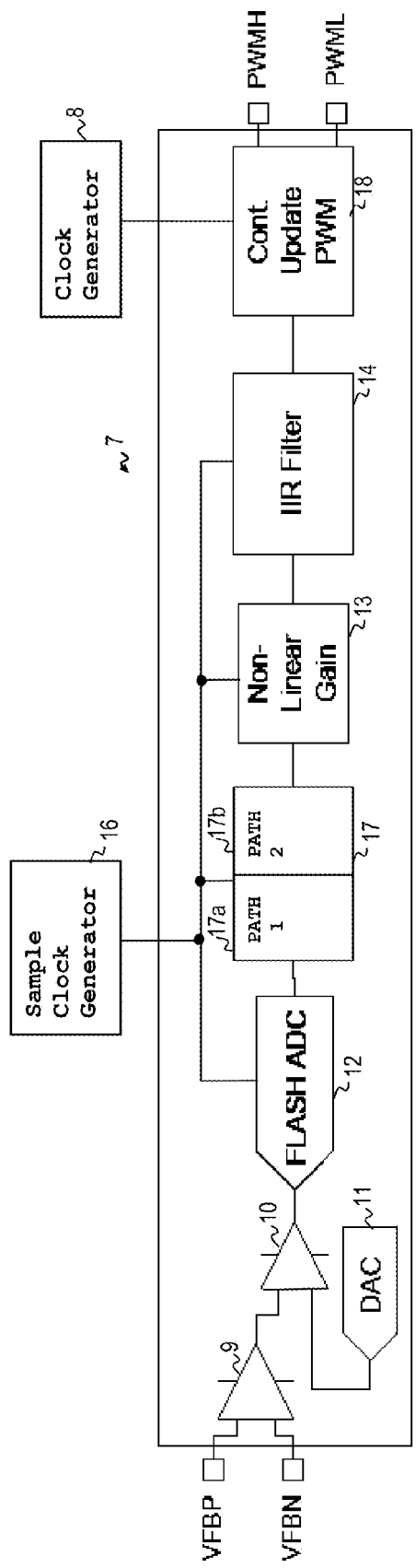

The invention shall now be explained in greater detail using an exemplary embodiment. In the accompanying drawings it shows FIG. 1 a buck converter with an arrangement (buck controller) to control a buck converter according to prior art, FIG. 2 the design of a buck controller according to prior art, FIG. 3 the design of a buck controller according to the invention, FIG. 4 the signal behavior of a buck controller according to prior art, namely a) the output voltage $V_{FB}$ and the target value of said voltage (straight, continuous line)

b) the deviation, i.e., the difference of the output voltage $V_{FB}$ from its target value after passing the analog-to-digital converter, c) of the calculated and adjusted pulse width and d) the target load current (straight line) in reference to the output current (serrated line) and the pulse width modulated pulse sequence $PWM_H$ FIG. 5 the signal behavior of an arrangement according to the invention (buck controller), namely a) the output voltage $V_{FB}$ and the target value of said voltage (straight, continuous line)

b) the deviation, i.e., the difference of the output voltage $V_{FB}$ from its target value after passing the analog-to-digital converter, c) of the calculated and adjusted pulse width and d) the target load current (straight line) in reference to the output current (serrated line) and the pulse width modulated pulse sequence $PWM_H$ FIG. 6. A design of a buck controller having two moving average filter paths according to the invention.

DETAILED DESCRIPTION

As shown in FIG. 1, in a buck converter 1 two switching transistors 2 and 3 are provided, each respectively switching alternating. Both transistors 2 and 3 are connected with their source-drain path in a current circuit between the input voltage VIN and the ground. An inductor 4 is connected therebetween, which is switched serially with a load resistor 5, over which the output voltage VFBP–VFBN drops. Parallel in reference to the load resistor a capacitor 6 is switched.

During the period the first transistor 2 is switched on, namely the one located at the side of the input voltage, a load current flows through the inductivity 4 and through the load resistor 5. The second transistor 3 is blocked. During the period the first transistor 2 is switched off, the second transistor 3 is switched on. Now the energy stored in the inductor 4 is drained. The current flows through the load 5, however now through the second transistor 3 and out of the capacitor 6.

By modifying the switch on and switch off periods of the transistors 2 and 3 the output voltage can be adjusted and controlled by adjusting these periods using settings in turn influencing the output voltage. The regulation occurs in a known fashion by pulse width modulation (PWM) of the control pulses at the gates of the transistors 2 and 3.

The control of the transistors 2 and 3 occurs via a buck controller 7, which is controlled by a clock generator 8 and to which the output voltage $V_{FBP}-V_{FBN}$ is returned as the control parameter.

Figure 2:
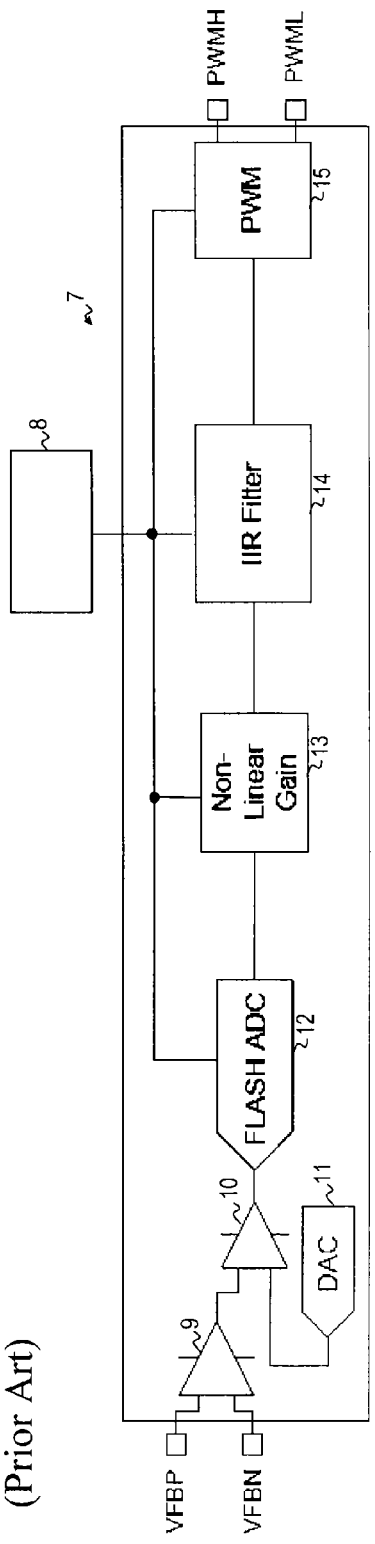

As shown in FIG. 2, the output voltage $V_{FBP}-V_{FBN}$ is applied to a first amplifier 9, with its output being applied to a difference amplifier 10. Here, the value of the target voltage is also applied, which is provided via a digital-to-analog converter 11 from a digital source, not shown in greater detail.

At the output of the difference amplifier 10 the deviation from the rule is then provided in an analog form. This is sampled via an analog-to-digital converter 12. This occurs according to prior art with the same frequency, by which also the pulse frequency occurs to control the transistors 2 and 3.

The digital value of the deviation at the output of the analog-to-digital converter 12 is then guided via a non-linear amplifier 13 and an IIR filter to a pulse width modulation circuit 15. This then represents the pulse width of the pulse sequence to control the transistors 2 and 3.

Figure 4:
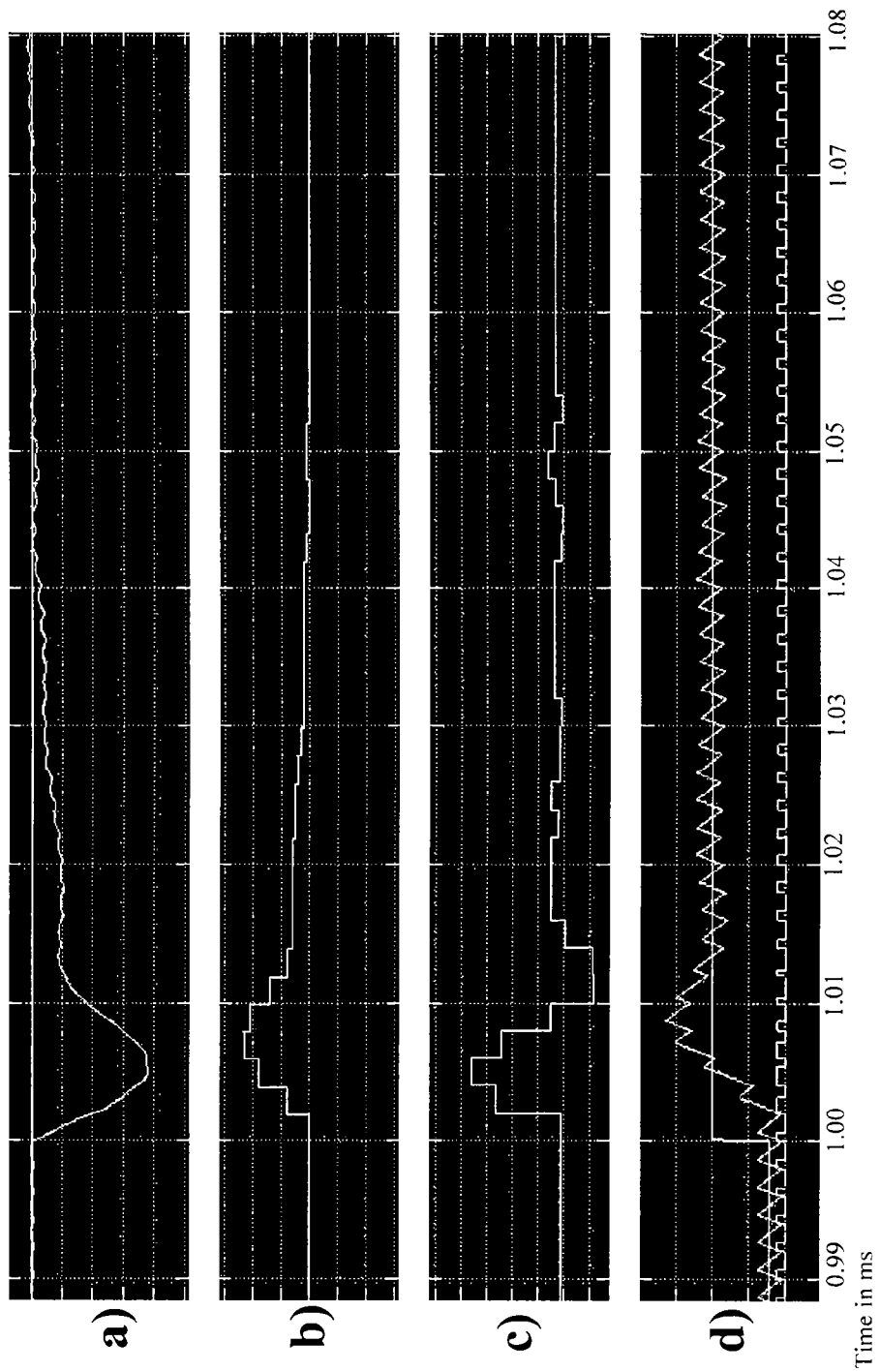

As shown in FIG. 4, the digital representation of the deviation according to FIG. 4b) is relatively coarse due to a considerable change of load at the load resistor 5. Using the same resolution, the size of the pulse width can then be determined, as shown in FIG. 4c).

As is apparent from FIG. 4d), this leads to considerable overshooting at the output of the buck converter 1 and to a visible delay at the transients in FIG. 4a)

Figure 3:
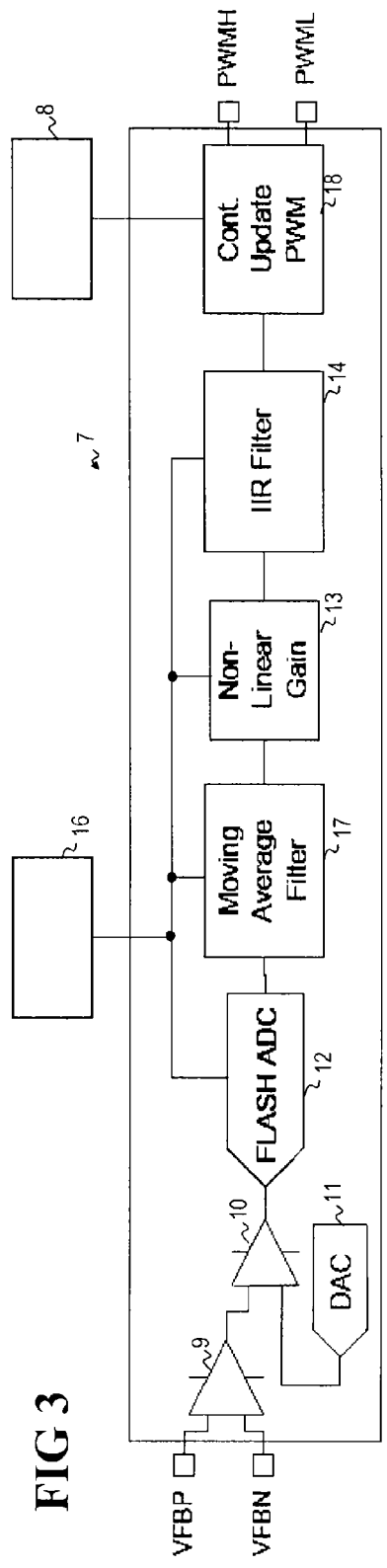

FIG. 3 shows the solution according to the invention. Identical reference characters here indicate equivalent components of prior art.

According to FIG. 3 a sample clock generator 16 is provided, which controls the analog-to-digital converter 12 and all subsequent units with a higher clock than the clock generator 8. This oversampling leads to an essentially larger resolution of the deviation, such as shown in FIG. 5b). This way, the analog-to-digital converter 12 can sample the deviation n-times during the period length of the pulse sequence in order to control the transistors 2 and 3, for example 32 times per 2 µs length of period. The oversampling rate n can be programmed.

A moving average filter 17 is arranged downstream in reference to the analog-to-digital converter 12. As illustrated in FIG. 6, two moving average filter paths (17a and 17b) are implemented, with their reduction rates being programmable. Typically, a filter path is programmed for a reduction rate, which is equivalent to the oversampling rate. Another filter path is programmed, for example, to one-fourth of the oversampling rate. The higher reduction rate leads to a considerable restriction of the bandwidth of the sampled deviation signal. For this reason it is used during the steady-rate operation as is discernible in FIG. 5a) on the right side, in order to eliminate values that would couple noise into the return, particularly during the "rippling" of the output signal.

The filter path with the low reduction rate is used during load changes, such as is discernible in FIG. 5a) on the left side. It provides a greater bandwidth of the sampled deviation, which allows a quick reaction of the control circuit.

Within the moving average filter 17 a determination of a threshold being crossed is also included regarding the change of the speed of deviation. One or the other filter path is selected depending on a threshold being exceeded or fallen short of.

As shown in FIG. 3, a continuously adjustable pulse width modulation circuit 18 is provided. This way it is possible to adjust the pulse width of the pulse sequence also during the duty cycle.

As is apparent from FIG. 5, particularly from d), the control occurs after a change of load causing a considerable transient essentially faster and with much less overshooting.

In particular the ability for programming the parameters allows an easy adjustment to the different purposes for use.

The invention claimed is:

1. A method for regulating a buck converter, comprising: adjusting amount of an output voltage derived from an input voltage via a controlled switching of an inductor, switched serially with a load and over which the output voltage drops, using a pulse sequence having a pulse rate and pulse width being modulated, wherein the output voltage is scanned with a sample rate, its value digitized, and used to adjust pulse width, adjusting the sample rate to be greater than the pulse rate and controlling the pulse rate of the pulse sequence during cycle duration.

2. A method according to claim 1, wherein the sample rate is adjusted to 2 to 100 times the pulse rate.

3. A method according to claim 2, wherein the sample rate is adjusted to 32 times the pulse rate.

4. A method according to one of claims 1 to 3, further comprising subjecting a digital signal generated by the sample rate to a digital reduction via filtering such that sample values are filtered out which are to be allocated to an integer multiple of sample frequency according to the sample rate.

5. A method according to claim 4, wherein the reduction occurs via a moving average filter, which has several filter maxima at integral multiples of the sample frequency.

6. A method according to claim 4, wherein the digital signal is filtered with a programmable reduction rate.

7. A method according to claim 6, wherein the reduction with a first reduction rate is performed during periods with essentially constant load, i.e., with a first transient, and with a second reduction rate during periods of load changes, i.e., with a second transient higher in reference to the first transient, with the second reduction rate being smaller than the first reduction rate.

8. An arrangement for regulating a buck converter having a control input for a pulse width modulated pulse sequence with a pulse rate and a voltage output, the arrangement comprising a control input connected to the voltage output of the buck converter, and a control output connected to the control input of the buck converter, and having between the control input and the control output, an analogue-to-digital converter, a non-lineal amplifier, an IIR filter, and a pulse width modulation circuit and having a pulse rate clock generator determining the pulse rate, wherein a moving average filter is arranged between the analog-to-digital converter and the non-linear amplifier, a sample rate clock generator having a sample rate higher than the pulse rate controls, at the sample rate, the analog-to-digital converter, the moving average filter, the non-linear amplifier, and the IIR filter, the pulse rate clock generator being connected to the pulse width modulation circuit, and the pulse width modulation circuit being continuously controlled in pulse width, including during duration of the pulse period.

9. An arrangement according to claim 8, wherein the moving average filter comprises two moving average filter paths with differently programmable reduction rates.

* * * * *